(12) United States Patent
Marchetti et al.

(10) Patent No.: US 9,434,095 B2
(45) Date of Patent: Sep. 6, 2016

(54) HYBRID COMPOSITE UTILIZING GAS-ASSISTED MOLDING GEOMETRIES

(71) Applicant: Ford Global Technologies, LLC, Dearborn, MI (US)

(72) Inventors: Bernard Gerard Marchetti, Rochester Hills, MI (US); Kalyanaraman Bharathan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/711,064

(22) Filed: May 13, 2015

(65) Prior Publication Data

US 2015/0321704 A1 Nov. 12, 2015

Related U.S. Application Data

(63) Continuation-in-part of application No. 14/270,951, filed on May 6, 2014, now Pat. No. 9,186,993.

(51) Int. Cl.
| | |
|---|---|
| *B60K 37/00* | (2006.01) |
| *B29C 45/00* | (2006.01) |
| *B62D 29/04* | (2006.01) |
| *B62D 25/14* | (2006.01) |
| *B62D 27/02* | (2006.01) |

(Continued)

(52) U.S. Cl.
CPC ........... *B29C 45/0005* (2013.01); *B29C 45/16* (2013.01); *B29C 45/1704* (2013.01); *B62D 25/14* (2013.01); *B62D 27/026* (2013.01); *B62D 29/043* (2013.01); *B29K 2105/12* (2013.01); *B29L 2031/3008* (2013.01)

(58) Field of Classification Search
CPC .... B60K 37/00; B62D 25/14; B62D 43/003; B62D 47/0004
USPC ............................................... 296/70; 180/90
See application file for complete search history.

(56) References Cited

U.S. PATENT DOCUMENTS

| | | | |
|---|---|---|---|
| 4,884,778 | A | 12/1989 | Yamamoto |
| 5,088,571 | A | 2/1992 | Burry et al. |

(Continued)

FOREIGN PATENT DOCUMENTS

| | | |
|---|---|---|
| DE | 3806783 A1 | 9/1989 |
| DE | 102008021103 A1 | 10/2009 |

(Continued)

*Primary Examiner* — James English
(74) *Attorney, Agent, or Firm* — Vichit Chea; Price Heneveld LLP

(57) ABSTRACT

A vehicular instrument panel includes a substrate having a first plurality of chopped carbon fibers and a first plurality of chopped glass fibers within a first nylon resin. The first plurality of chopped carbon fibers and the first plurality of glass fibers in the substrate are segregated such that the carbon fibers and the glass fibers are each substantially concentrated within respective driver-side and passenger-side portions of the substrate. A reinforcement includes a second plurality of chopped carbon fibers within a second nylon resin. A reinforcement rib is integrally defined by the reinforcement. The reinforcement rib is substantially hollow and positioned on a driver-side portion of the reinforcement. A substrate rib is integrally defined by the substrate. The substrate rib is substantially hollow and positioned on the driver-side portion of the substrate. The substrate rib and the reinforcement rib are bonded to one another.

20 Claims, 8 Drawing Sheets

(51) Int. Cl.
  *B29C 45/16* (2006.01)
  *B29C 45/17* (2006.01)
  *B29L 31/30* (2006.01)
  *B29K 105/12* (2006.01)

(56) References Cited

U.S. PATENT DOCUMENTS

| | | | |
|---|---|---|---|
| 5,162,092 | A | 11/1992 | Klobucar et al. |
| 5,364,159 | A | 11/1994 | Kelman et al. |
| 5,979,860 | A | 11/1999 | Jurik et al. |
| 5,997,781 | A | 12/1999 | Nishikawa et al. |
| 6,063,315 | A | 5/2000 | Keller et al. |
| 6,260,875 | B1 | 7/2001 | Stawicki et al. |
| 6,497,432 | B2 | 12/2002 | Scheib et al. |
| 6,517,145 | B2 | 2/2003 | Hedderly |
| 6,692,026 | B2 | 2/2004 | Gianaris et al. |
| 6,773,640 | B2 | 8/2004 | Sugihara et al. |
| 6,802,559 | B2 | 10/2004 | Yoshihara et al. |
| 6,875,484 | B1 | 4/2005 | Kogure et al. |
| 6,952,979 | B2 | 10/2005 | Cartwright et al. |
| 7,303,714 | B2 | 12/2007 | Matsuzaki et al. |
| 7,364,788 | B2 | 4/2008 | Kishbaugh et al. |
| 7,528,206 | B2 | 5/2009 | Kitano et al. |
| 7,632,445 | B2 | 12/2009 | Porter et al. |
| 8,221,673 | B2 | 7/2012 | Saur et al. |
| 8,449,013 | B2 | 5/2013 | Carter |
| 2006/0051569 | A1 | 3/2006 | Porter et al. |
| 2006/0097539 | A1 | 5/2006 | Noisternig et al. |
| 2007/0160779 | A1* | 7/2007 | Obara ............... B29C 49/4802 428/31 |
| 2008/0098655 | A1 | 5/2008 | Valentage |
| 2008/0315612 | A1 | 12/2008 | D'Alessandro |
| 2011/0233955 | A1 | 9/2011 | Utsugi et al. |
| 2013/0052412 | A1 | 2/2013 | Fox et al. |
| 2013/0249242 | A1 | 9/2013 | Kimoto et al. |

FOREIGN PATENT DOCUMENTS

| | | |
|---|---|---|
| EP | 0083701 A2 | 7/1983 |
| EP | 0925895 A1 | 12/1998 |
| WO | 0170558 A1 | 9/2001 |
| WO | 2013072021 A1 | 5/2013 |

* cited by examiner

HYBRID COMPOSITE UTILIZING GAS-ASSISTED MOLDING GEOMETRIES

CROSS-REFERENCE TO RELATED APPLICATION

The present application is a continuation-in-part application that claims priority to and the benefit under 35 U.S.C. §120 of U.S. patent application Ser. No. 14/270,951 filed on May 6, 2014, now issued as U.S. Pat. No. 9,186,993, entitled "HYBRID COMPOSITE INSTRUMENT PANEL," the entire disclosure of which is hereby incorporated herein by reference.

FIELD OF THE INVENTION

The present disclosure generally relates to composite component designs, and more particularly relates to composite vehicular instrument panel designs and methods for making the same.

BACKGROUND OF THE INVENTION

It is becoming more common for vehicles to utilize lightweight components and designs in order to decrease vehicle weight, particularly in large, interior vehicle components such as instrument panels. Weight reductions can increase vehicle performance and fuel economy. Weight savings may be realized by substituting current materials of vehicle components with lighter weight materials. However, in some cases, lighter weight materials employed in vehicles can have less mechanical integrity than their heavier weight counterparts.

In other cases, certain lighter weight materials, such as carbon fiber composites, can actually have improved mechanical performance over conventional materials. Unfortunately, the manufacturing costs of making vehicular components with these materials can be prohibitive or at least not low enough to offset the potential improvements in vehicle performance and fuel economy. Further, these stronger composite materials are often employed in large vehicular components that have only one, or a handful, of regions that actually require elevated mechanical performance.

Accordingly, there is a need for lighter-weight vehicular components having better or comparable mechanical performance when compared to conventional vehicular components. There is also a need to tailor the mechanical properties in particular regions within these components for the particular application, thus minimizing the use of expensive reinforcing materials and maximizing mechanical property enhancements where it is required in the component.

SUMMARY OF THE INVENTION

According to one aspect of this invention, a vehicular instrument panel includes a substrate having a first plurality of chopped carbon fibers and a first plurality of chopped glass fibers within a first nylon resin. The first plurality of chopped carbon fibers and the first plurality of glass fibers in the substrate are segregated such that the carbon fibers and the glass fibers are each substantially concentrated within respective driver-side and passenger-side portions of the substrate. A reinforcement is coupled to the substrate and includes a second plurality of chopped carbon fibers within a second nylon resin. A reinforcement rib is integrally defined by the reinforcement. The reinforcement rib is substantially hollow and positioned on a driver-side portion of the reinforcement. A substrate rib is integrally defined by the substrate. The substrate rib is substantially hollow and positioned on the driver-side portion of the substrate. The substrate rib and the reinforcement rib are bonded to one another.

According to another aspect of this invention, a vehicular instrument panel includes a first member having a fiber material within a first resin. The first member defines a first hollow rib. A second member is coupled to the first member and has driver-side, passenger-side, and center-stack portions. The second member defines a second hollow rib in the driver-side portion which is bonded to the first hollow rib. The driver-side portion includes a first fiber material within a second resin, the passenger-side portion comprises a second fiber material within the second resin, and the center-stack portion comprises a mixture of the first and second fiber materials within the second resin.

According to yet another aspect of this invention, a vehicular instrument panel includes a reinforcement having a plurality of chopped carbon fibers within a nylon resin. The reinforcement has a hollow reinforcement rib. A substrate is coupled to the reinforcement and includes a plurality of chopped carbon and chopped glass fibers segregated into respective driver-side and passenger-side portions. The substrate has a hollow substrate rib. The reinforcement rib and the substrate rib are bonded to one another.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

Figure 1:
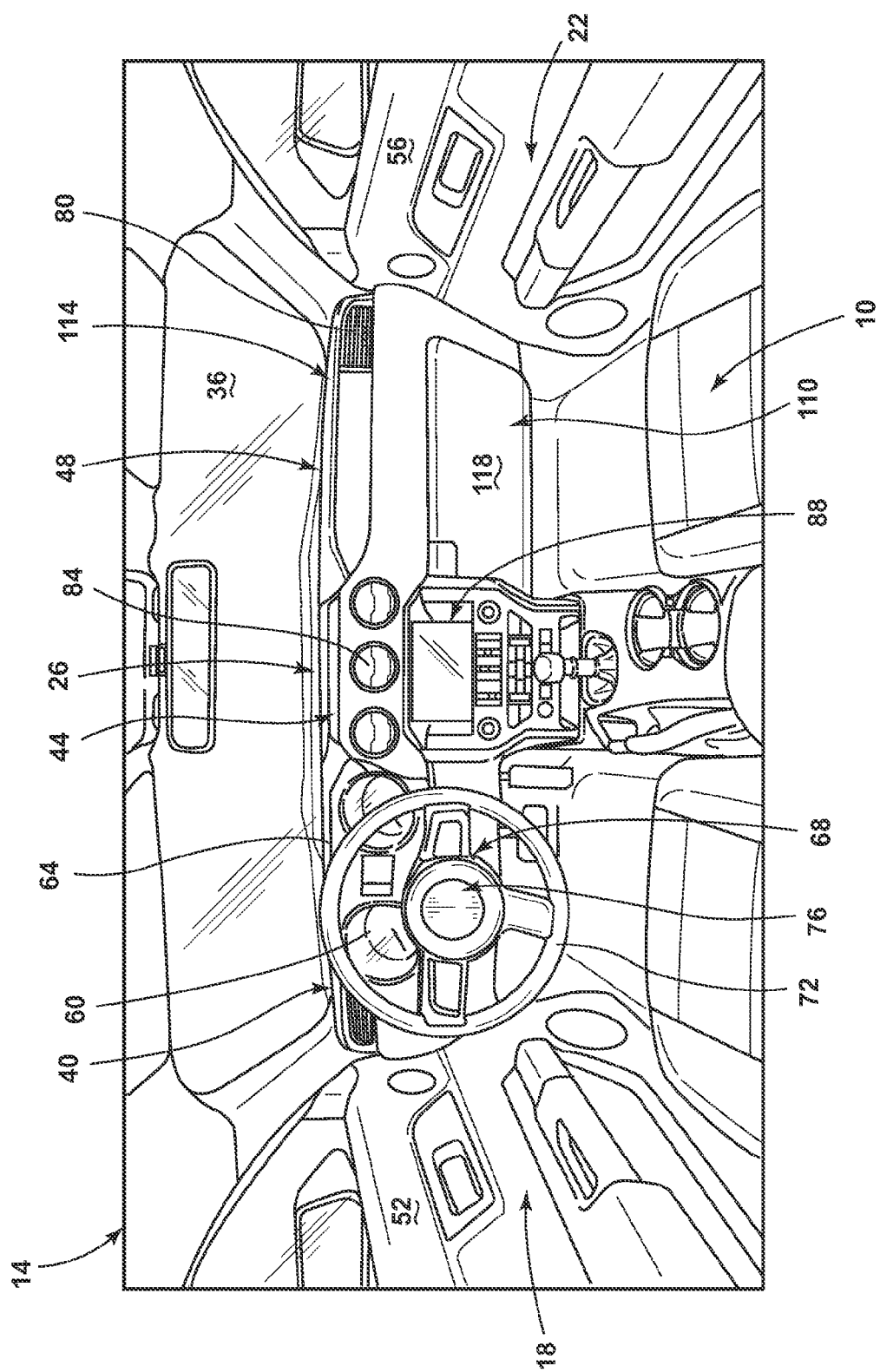
FIG. 1 is a front perspective view of a vehicular instrument panel within a vehicle according to one embodiment.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, a cabin 10 of a vehicle 14 is depicted. The vehicle 14 includes a driver-side region 18 and a passenger-side region 22. Inside the cabin 10 is an instrument panel 26, among other vehicle components, such as a windshield 36. The instrument panel 26 is located vehicle forward of the passenger seating in the cabin 10 and generally beneath the windshield 36. The instrument panel 26 has a driver-side portion 40, a center-stack portion 44, and a passenger-side portion 48. These portions of the instrument panel 26, and particular regions or locations within them, often have differing mechanical property requirements.

As used in this disclosure, "outboard" refers to the lateral sides or regions most proximate to a driver-side door 52 and a passenger-side door 56 in the vehicle 14. The term "inboard" as used in this disclosure refers to a central area in the vehicle 14 inboard from the laterally opposing outboard sides or regions.

The driver-side and passenger-side portions 40, 48 of the instrument panel 26 are in substantial proximity to respective driver-side and passenger-side regions 18, 22 of the vehicle 14. The driver-side portion 40 of the instrument panel 26 includes an instrument cluster 60 covered by an instrument cluster hood 64. Located below the instrument cluster 60 is a steering column 68. The steering column 68 is supported by the instrument panel 26 and engages a steering system (not shown) vehicle forward of the instrument panel 26. The steering column 68 extends from the steering system into the cabin 10 through the instrument panel 26. The steering column 68 has a steering wheel 72 disposed in the cabin 10 in the driver-side region 18 of the vehicle 14. The steering wheel 72 includes a driver airbag 76 which is deployable upon experiencing a sufficient vehicle collision event. As such, the driver-side portion 40 of the instrument panel 26 can have demanding mechanical requirements, particularly at locations where it must support other vehicular components subject to variable loads and motion, e.g., steering column 68.

Disposed on each outboard side of the instrument panel 26 is a side air vent 80. The instrument panel 26 also incorporates a set of central air vents 84 located in the center-stack portion 44 of the instrument panel 26. The center-stack portion 44 of the instrument panel 26 is located between the driver-side portion 40 and the passenger-side portion 48. The center-stack portion 44 includes an interface 88 that is operable by occupants of both the driver-side and the passenger-side regions 18, 22 of the vehicle 14. The center-stack portion 44 is connected to both the driver-side portion 40 and the passenger-side portion 48 of the instrument panel 26.

As also depicted in FIG. 1, the passenger-side portion 48 of the instrument panel 26 includes a glove box assembly 110, and a passenger airbag assembly 114 that is located above the assembly 110. The glove box assembly 110 includes a glove box door 118 permitting access to a glove box bin (not shown). In some embodiments, the glove box assembly 110 is a separate component from the instrument panel 26 and is inserted and attached during vehicle manufacturing. In other embodiments, the glove box bin of the assembly 110 is integrally formed from an instrument panel substrate 120 (FIG. 2) of the instrument panel 26 and the glove box door 118 is a separate component that is attached during manufacturing. Depending on the configuration of passenger-side portion 48, it may have central regions or locations that require additional mechanical reinforcement, such as where it contains or attaches to glove box assembly 110.

The passenger airbag assembly 114 includes a passenger airbag chute 124 (FIG. 2), and other components such as a passenger airbag, an airbag canister, and an inflator. During a vehicle collision event, the passenger airbag is inflated by the inflator (not shown), thereby causing the passenger airbag to expand from the canister through the passenger airbag chute 124 (FIG. 2) and out of the instrument panel 26. The inflation and expansion of the airbag generates high stresses in surrounding components which can lead to structural failure of the instrument panel 26 if not properly reinforced. In some embodiments, the instrument panel substrate 120 (FIG. 2) of the instrument panel 26 may also include knee airbag canisters for the occupants of both the driver-side and passenger-side regions 18, 22, potentially necessitating additional reinforcement.

Figure 2:
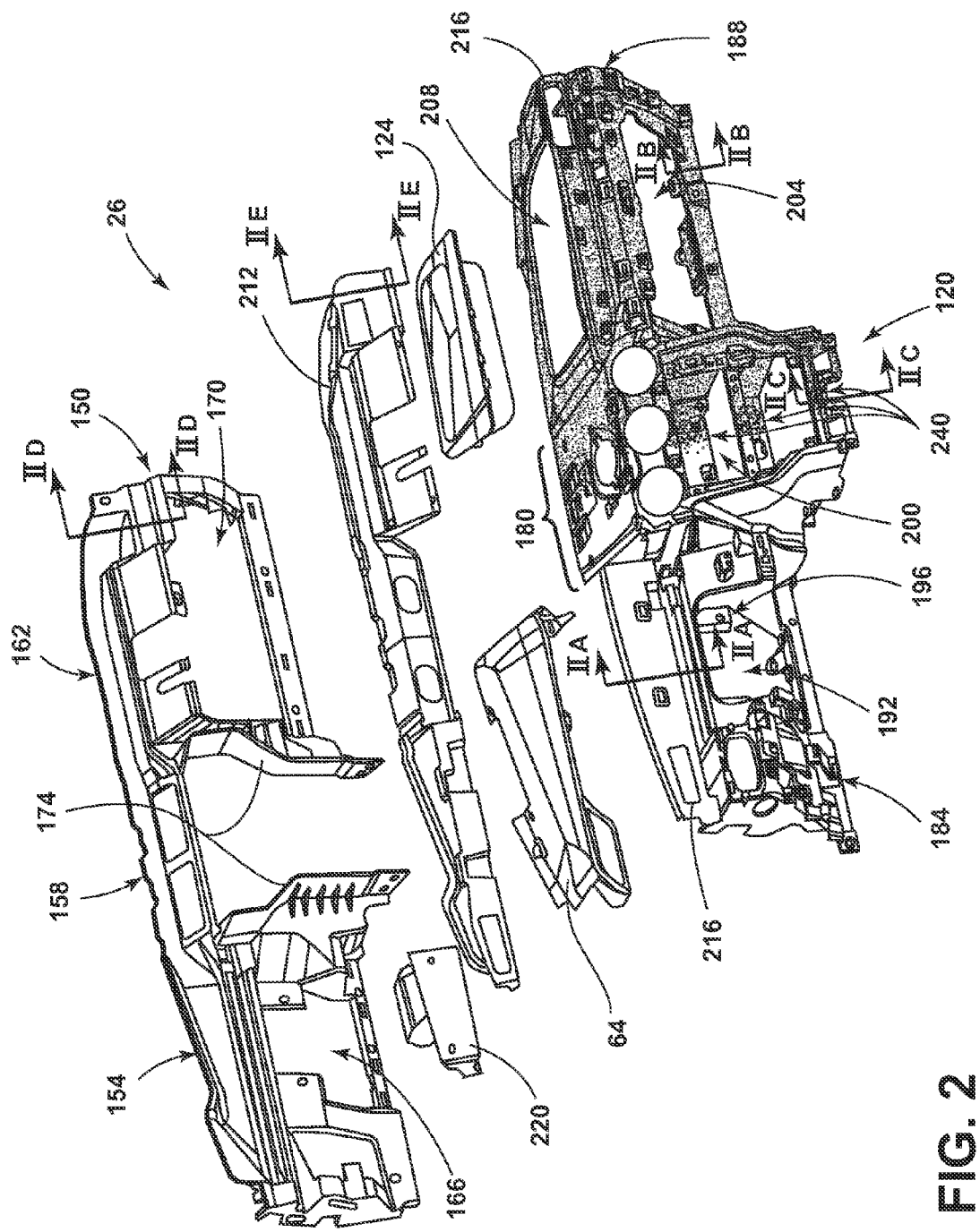
FIG. 2 is an exploded top perspective view of the instrument panel depicted in FIG. 1.
Figure 2A:
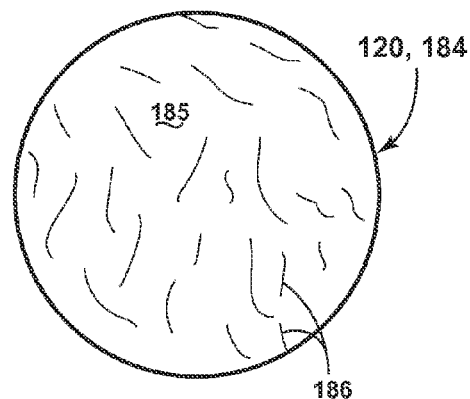
FIG. 2A is an enhanced cross sectional view of the instrument panel of FIG. 2, taken at IIA-IIA.
Figure 2B:
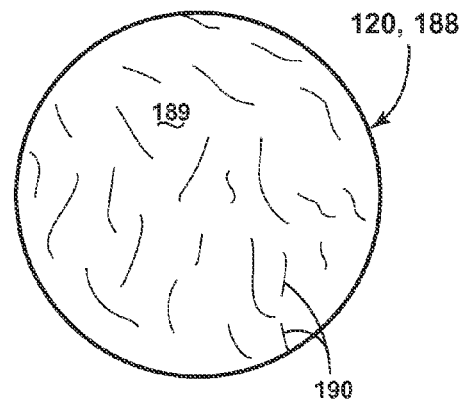
FIG. 2B is an enhanced cross sectional view of the instrument panel of FIG. 2, taken at IIB-IIB.
Figure 2C:
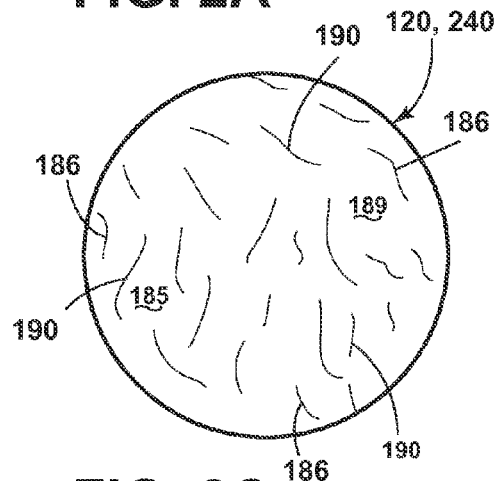
FIG. 2C is an enhanced cross sectional view of the instrument panel of FIG. 2, taken at IIC-IIC.
Figure 2D:
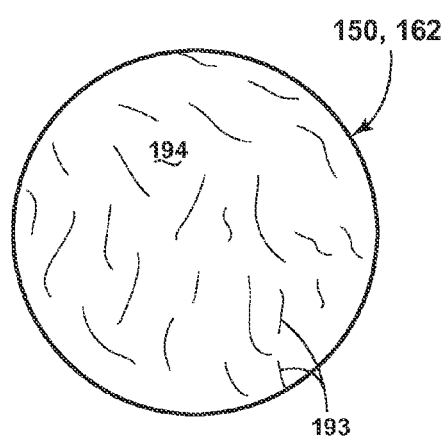
FIG. 2D is an enhanced cross sectional view of the instrument panel of FIG. 2, taken at IID-IID.
Figure 2E:
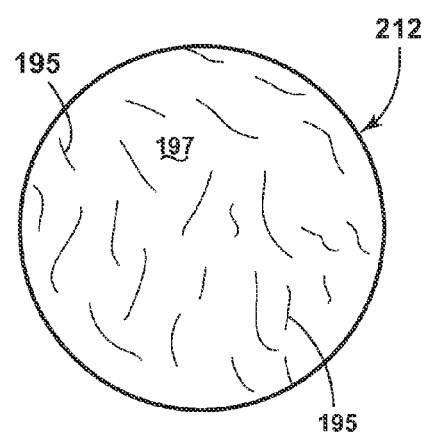
FIG. 2E is an enhanced cross sectional view of the instrument panel of FIG. 2, taken at IIE-IIE.

Referring now to FIG. 2, the instrument panel 26 includes the instrument panel substrate 120 and a reinforcement 150. The reinforcement 150 is located vehicle forward of the substrate 120 and is coupled to the substrate 120 at multiple points. The substrate 120 and the reinforcement 150 may be coupled via adhesive bonding, vibration welding, hot plate welding, or other forms of joining. The reinforcement 150 includes a driver-side portion 154, a center-stack portion 158, and a passenger-side portion 162. The reinforcement 150 defines a steering column aperture 166 and a glove box aperture 170 on the respective driver-side and passenger-side portions 154, 162. Flanges 174 are located within the center-stack portion 158 of the reinforcement 150 and extend vehicle rearward to engage and couple with a center-stack portion 180 of the substrate 120.

As also depicted in FIG. 2, the instrument panel substrate 120 includes a driver-side portion 184, the center-stack portion 180, and a passenger-side portion 188. The driver-side portion 184 of the substrate 120 defines a steering column opening 192 which aligns with the steering column aperture 166 of the reinforcement 150 when the substrate 120 and the reinforcement 150 are coupled. The steering column 68 (FIG. 1) passes through both the steering column aperture 166 and the steering column opening 192, and is attached to the substrate 120 via a steering column mounting area 196, as shown in FIG. 2. The steering column mounting area 196 is located on the substrate 120 proximate to the steering column opening 192. In some embodiments, a jacket for the steering column 68 may be integrally formed in the substrate 120 proximate to the mounting area 196. In other embodiments, a mounting bracket or a support bracket may be integrally formed in the substrate 120 proximate to the steering column opening 192 for supporting the steering column 68. The coupling of the reinforcement 150 to the substrate 120 provides sufficient strength for the mounting area 196, and ultimately the instrument panel 26, to support the weight of the steering column 68 without the use of a cross car beam. As such, certain regions or locations in the driver-side portion 184 of the substrate 120 may require and/or benefit from additional reinforcement.

The center-stack portion 180 of the instrument panel substrate 120 includes an electronics bay 200 for housing and mounting the interface 88 (FIG. 1) as well as other electronic components. The center-stack portion 180 is located between and is integrally connected to both the driver-side and passenger-side portions 184, 188 of the substrate 120. Depending on the electronic components and other components deployed in the center-stack portion 180, additional localized reinforcement in the substrate 120 with hybrid composites in these regions could provide mechanical performance and/or weight savings benefits.

The passenger-side portion 188 of the instrument panel substrate 120 defines a glove box opening 204 and a passenger airbag assembly opening 208 for housing the respective glove box assembly 110 (FIG. 1) and passenger airbag assembly 114 (FIG. 1). In some embodiments, the substrate 120 may be configured to further define a glove box bin and/or an airbag canister as integral bodies that extend from the respective glove box and passenger airbag assembly openings 204, 208. In other embodiments, the reinforcement 150 could be configured to define a glove box bin and/or an airbag canister. The substrate 120 and the reinforcement 150 can also be configured to define knee airbag canisters.

A duct 212 is located between the instrument panel substrate 120 and the reinforcement 150. The duct 212 conveys air when bonded to the reinforcement 150. The air travels though the duct 212 to a set of substrate vent openings 216 which direct the air to the side and central air vents 80, 84 of the instrument panel 26 (FIG. 1). Attached to the reinforcement 150 is a plenum bracket 220 which connects with a firewall (not shown) of the vehicle 14. The plenum bracket 220 prevents bending of the instrument panel 26 in a vehicle forward and rearward direction. The plenum bracket 220 can also provide additional support for the steering column 68 (FIG. 1), coupled to the substrate 120.

Referring again to FIG. 2, the instrument panel substrate 120 is formed from a hybrid composite material according to an embodiment of this disclosure. In one exemplary embodiment, the driver-side portion 184 can be formed from a nylon resin having chopped carbon fibers disposed in the resin. The passenger-side portion 188 can be formed from a nylon resin having chopped glass fibers disposed in the resin. In general, regions in the substrate 120 with higher percentages of chopped carbon fibers can have enhanced mechanical properties (e.g., toughness, tensile strength, fatigue resistance). The carbon fiber volume fraction and the glass fiber volume fraction in the passenger-side and driver-side portions 184, 188 may be between about 1% and about 60%, preferably between about 15% and about 40%, and more preferably between about 30% to about 40%. In some embodiments, the fiber volume fraction in the driver-side portion 184 may be different from the fiber volume fraction in the passenger-side portion 188 of the substrate 120. In additional embodiments, areas of the substrate 120 that are anticipated to encounter high stresses are configured to incorporate higher fiber volume fractions of chopped carbon fibers than areas not expected to experience high stresses. For example, the mounting area 196 may incorporate a higher fiber volume fraction, particularly of chopped carbon fibers, than the rest of the driver-side portion 184 of the substrate 120 to aid in supporting the steering column 68. In another example, the surfaces of the instrument panel substrate 120 and reinforcement 150 subject to high stress during airbag deployment may incorporate higher fiber volume fractions. In further embodiments, the driver-side and passenger-side portions 184, 188 of the substrate 120 may incorporate more than two composite materials.

In some embodiments, the fibers employed in the driver-side and passenger-side portions 184, 188 of the instrument panel substrate 120 can be composed of materials including carbons, aramids, aluminum metals, aluminum oxides, steels, borons, silicas, silicon carbides, silicon nitrides, ultra-high-molecular-weight polyethylenes, A-glasses, E-glasses, E-CR-glasses, C glasses, D-glasses, R-glasses, and S-glasses. Driver-side and passenger-side portions 184, 188 may also incorporate more than one type of fiber. In some embodiments, the length of the chopped fibers can be between about 3 mm and about 11 mm, and more preferably between about 5 mm and about 7 mm. Typically, the fibers are randomly oriented in the resins within the driver-side and passenger-side portions 184, 188. However, they may also be substantially aligned directionally in areas of the substrate 120 subject to high directional stresses. Further, the resins employed in the driver-side and passenger-side portions 184, 188 can comprise a nylon, a polypropylene, an epoxy, a polyester, a vinyl ester, a polyetheretherketone, a poly(phenylene sulfide), a polyetherimide, a polycarbonate, a silicone, a polyimide, a poly(ether sulfone), a melamine-formaldehyde, a phenol-formaldehyde, and a polybenzimidazole, or combinations thereof. In some embodiments, the resin of the driver-side portion 184 may be different from the resin employed in the passenger-side portion 188 of the substrate 120. It should also be understood that the reinforcement 150 and its driver-side, center-stack and passenger-side portions 154, 158, 162 can be fabricated with hybrid composite materials comparable to those described above in connection with substrate 120. For example, the driver-side portion 154 of the reinforcement 150 can be formed from a nylon resin having chopped carbon fibers disposed in the resin. The passenger-side portion 162 can be formed from a nylon resin having chopped glass fibers disposed in the resin. Further, the volume fraction of the fibers in the resins, preferably the chopped carbon fibers, may be greater in areas subject to higher stress levels than in other areas or the rest of the reinforcement 150.

Still referring to FIG. 2, the chopped carbon and glass fibers are segregated in the substrate 120 of the instrument panel 26 such that the carbon fibers are substantially concentrated in the driver-side portion 184 of the substrate 120 and the glass fibers are substantially concentrated in the passenger-side portion 188 of the substrate 120. In general, the center-stack portion 180 of the substrate 120 is composed of both chopped carbon and glass fibers. In some embodiments, the center-stack portion 180 may primarily include carbon fibers, or primarily glass fibers. In other embodiments, the carbon fibers primarily contained in the driver-side portion 184 may also partially occupy the passenger-side portion 188 of the substrate 120. In further embodiments, the carbon fibers primarily in the driver-side portion 184 may also occupy portions of the substrate 120 which are subject to high stress, regardless of passenger-side or driver-side orientation. For example, airbag deployment surfaces located in or on the substrate 120 or reinforcement 150 can include higher percentages of carbon fibers for additional mechanical reinforcement. The segregation of the fibers, e.g., chopped carbon and glass fibers, in the substrate 120 allows the higher strength fiber, e.g., carbon fiber, to be selectively used where there are particular high strength needs for the substrate 120, such as to support the steering column 68. The selective use of high percentages of carbon fibers based on driver/passenger orientation relative to the vehicle 14 allows a cost savings by efficiently using the more expensive carbon fibers only where needed.

A boundary region 240 can exist in some embodiments at the interface between the driver-side and passenger-side portions 184, 188 of the instrument panel substrate 120. The boundary region 240 includes a mixture of both types of fibers and resin(s) employed in the driver-side and passenger-side portions 184, 188 of the substrate 120. The mixing of fibers within the boundary region 240 ensures that an integral connection exists between portions of the substrate 120 composed of different composite materials. In one embodiment, the boundary region 240 may span or otherwise encompass the entire center-stack portion 180 of the substrate 120. In another embodiment, the boundary region 240 may be present only between the center-stack and passenger-side portions 180, 188, or between the driver-side and center-stack portions 184, 180 of the substrate 120. The boundary region 240 can also be located anywhere in the substrate 120 where there is an interface between portions of the substrate 120 containing differing fiber fractions, fiber types and/or resins. In one exemplary embodiment, driver-side portion 184 may have an approximate 30% to 40% volume fraction of chopped carbon fibers in a resin, the passenger-side portion 188 may have an approximate 30% to 40% volume fraction of chopped glass fibers in the resin, and the center-stack portion 180 or the boundary region 240 may have an approximate 15% to 20% volume fraction of chopped carbon fibers and an approximate 15% to 20% volume fraction of chopped glass fibers in the resin. In this configuration, the driver-side portion 184 is particularly reinforced with higher percentages of chopped carbon fibers relative to other portions of the substrate 120.

Referring now to the depicted embodiments of FIGS. 2A-E, the driver-side portion of the substrate 120 is depicted as having a first plurality of chopped carbon fibers 186 disposed in a first nylon resin 185. The passenger-side portion 188 of the substrate 120 is depicted as having a first plurality of glass fibers 190 disposed in a second nylon resin 189. As explained above, the boundary region 240 within the substrate 120 includes a mixture of the first plurality of chopped carbon fibers 186, the first plurality of chopped glass fibers 190, the first nylon resin 185, and the second nylon resin 189. The reinforcement 150 includes a second plurality of chopped carbon fibers 193 disposed in a third nylon resin 194. The duct 212 includes a second plurality of chopped glass fibers 195 disposed in a fourth nylon resin 197.

According to some embodiments, the instrument panel substrate 120 and/or the reinforcement 150 of the instrument panel 26 may incorporate one or more preformed fiber mats in addition to the portions containing chopped fibers in a resin or resins. The preformed fiber mats may include woven or non-woven fibers that are held together using the same or different resins as employed in the driver-side and passenger-side portions 184, 188 of the substrate 120. The mats may also incorporate fibers having different dimensions from the fibers employed in the driver-side and passenger-side portions 184, 188 of the substrate 120. Similarly, the fibers of the mats may be in either a continuous or chopped configuration. The fibers of the mats may also be composed of a material having the same or a different composition from that of the fibers employed in the driver-side and passenger-side portions 184, 188 of the substrate 120. The mats may be incorporated in areas of the substrate 120 and/or the reinforcement 150 having high or low fiber volume fractions. Multiple mats may be used and layered in varying orientations in order to further enhance the mechanical properties of the substrate 120 and/or reinforcement 150 at particular locations. Exemplary locations in the substrate 120 for placement of the mat include, but are not limited to: the steering column mounting area 196, airbag assembly opening 208, glove box opening 204, coupling locations between the reinforcement 150 and the substrate 120, and other locations anticipated to experience higher stress levels compared to stresses in other areas of the substrate 120.

The utilization of a hybrid composite containing carbon fibers in the substrate 120 and the reinforcement 150 permits the vehicle 14 to be designed and manufactured without a cross car beam. Conventional cross car beams are thick metal components traditionally used to support the instrument panel 26 and the steering column 68 of the vehicle 14. In addition to adding significant weight to the vehicle 14, the cross car beam occupies a potential storage space behind the instrument panel 26 and obstructs placement of the passenger airbag assembly 114 and the glove box assembly 110. Without the cross car beam, the vehicle 14 can achieve greater fuel efficiency as well as enhanced design freedom for the instrument panel 26 and its subassemblies.

Figure 3:
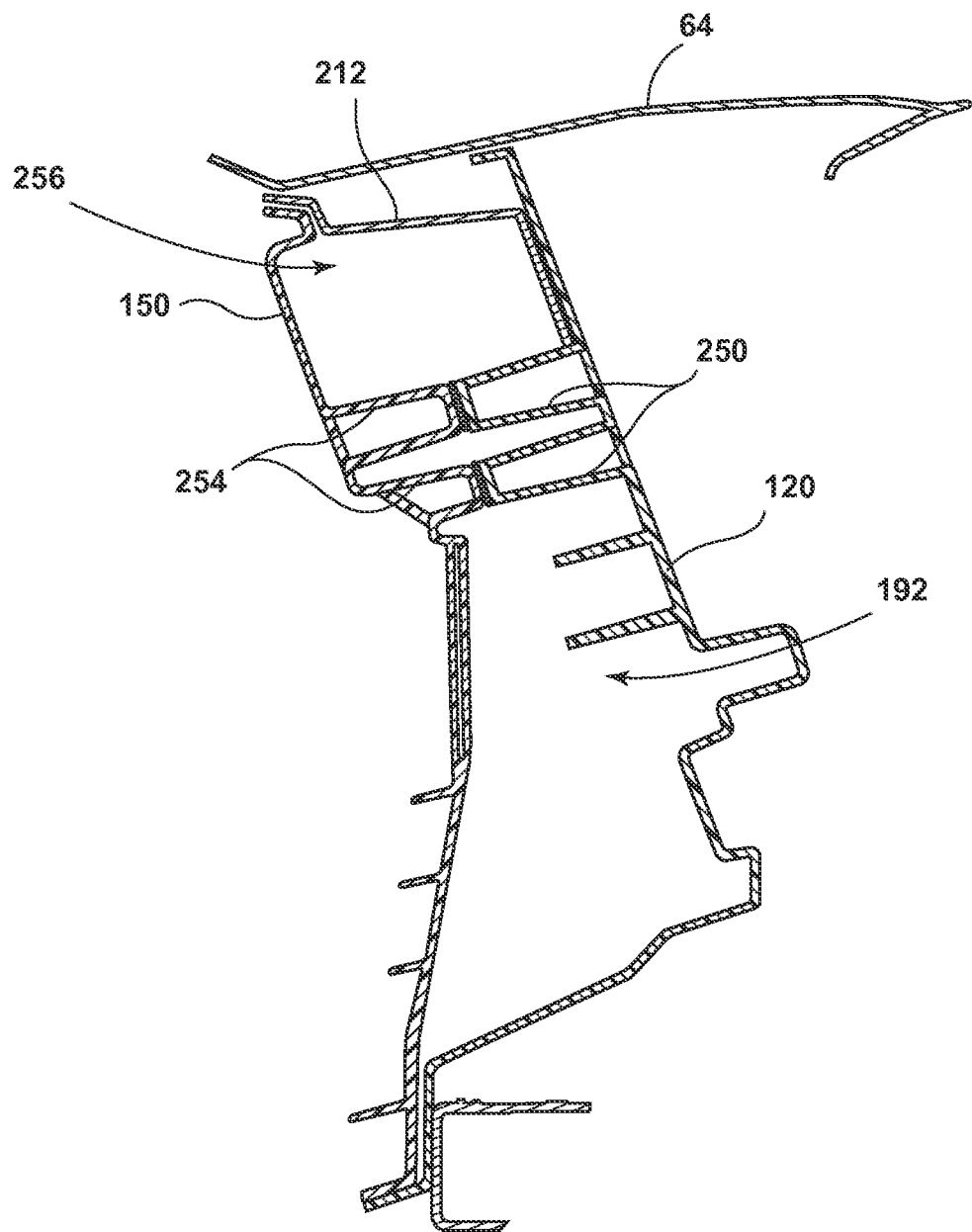
FIG. 3 a cross-sectional view of the instrument panel of FIG. 2 in assembly, taken at line III-III.

Referring now to the embodiment depicted in FIGS. 2 and 3, the substrate 120 integrally defines substrate ribs 250 and the reinforcement 150 integrally defines reinforcement ribs 254. The substrate ribs 250 and the reinforcement ribs 254 may be defined by any part of the substrate 120 or the reinforcement 150 prone to high stresses (e.g., proximate the steering column mount 196, glove box opening 204, passenger airbag opening 208, connection points between components, and/or boundary region 240). Although the substrate 120 and the reinforcement 150 are each depicted as defining two ribs 250, 254, it should be understood that one or more ribs 250, 254 are contemplated. The substrate ribs 250 are positioned above the steering column opening 192 of the substrate 120 and adjacent the mounting area 196. The reinforcement ribs 254 are positioned above the steering column aperture 166 of the reinforcement 150. Additionally or alternatively, substrate ribs 250 and reinforcement ribs 254 may be located throughout the respective substrate 120 and reinforcement 150. The substrate and reinforcement ribs 250, 254 are continuous structures extending along the driver-side portions 184, 154 of the substrate and reinforcement 120, 150, but may also be discontinuous or intermittent structures. The substrate ribs 250 extend only over the steering column opening 192, but may also extend the entire length of the driver-side portion 184 or any length there between. Similarly to the substrate ribs 250, the reinforcement ribs 254 may also extend over any length of the driver-side portion 154 of the reinforcement 150. In embodiments where the substrate 120 and/or the reinforcement 150 define more than one rib 250, 254, the ribs may be discrete structures or connected in a branched structure and spaced apart. In the depicted embodiment, the substrate ribs 250 run parallel to one another, but are also contemplated to range in orientation between parallel and perpendicular. Similarly to that described in connection with the substrate ribs 250, the reinforcement ribs 254 may also take a variety of orientations to one another.

Referring now to FIG. 3, the substrate ribs 250 and the reinforcement ribs 254 are substantially hollow along the length of the ribs 250, 254. For the purposes of this disclosure, "substantially hollow" refers to the ribs 250, 254 being largely free of blockages, however, it is contemplated that flashing, as well as reinforcing geometries, may be employed within the ribs 250, 254 that may partially obstruct the ribs 250, 254 without departing from the spirit of this disclosure. The substrate ribs 250 and the reinforcement ribs 254 are formed during the formation of the substrate 120 and the reinforcement 150, respectively. Although depicted as substantially trapezoidal in shape, the substrate and reinforcement ribs 250, 254 may be squared, rounded, or domed. In some embodiments, the ribs 250, 254 may be formed through the joining of sub-assemblies of the substrate 120 and reinforcement 150.

In assembly, the substrate ribs 250 and the reinforcement ribs 254 are configured to be bonded to one another in order to secure the substrate 120 and the reinforcement 150 together. In the depicted trapezoidal configuration, a surface of the substrate ribs 250 is bonded to a surface of the reinforcement ribs 254. In some embodiments, the substrate ribs 250 and the reinforcement ribs 254 may be configured to have more than one surface to be bonded together on. Additionally or alternatively, the substrate ribs 250 and the reinforcement ribs 254 may be configured to interlock or mate. For example, the substrate ribs 250 and the reinforcement ribs 254 may jointly define a snap fastener, click fastener, or other mechanical fastening protrusions and apertures. In non-mechanical bonding techniques, the ribs 250, 254 are bonded via adhesive bonding, vibration welding, hot plate welding, or other chemical and thermal forms of joining. In a particular embodiment, the ribs 250, 254 are bonded using a urethane based adhesive. Although only depicted as bonded proximate the steering column opening 192, it should be understood that substrate ribs 250 and reinforcement ribs 254 may be bonded at any point along the substrate 120 and reinforcement 150 where both are present. The substrate and reinforcement ribs 250, 254, when bonded together, cooperate with the duct 212 and the reinforcement 150 to define a hollow tube 256 which may function as a pseudo cross car beam while also functioning to transport air through the instrument panel 26.

Integrally defining ribs 250, 254 into the substrate 120 and the reinforcement 150 allows for an increase in the stiffness of the substrate 120 and the reinforcement 150 without a proportional increase in the amount of material used. The decreased usage of material directly leads to weight and cost savings, particularly in embodiments utilizing carbon fiber. The three dimensional structure of the ribs 250, 254 resists bending by the substrate 120 and the reinforcement 150, thereby increasing the strength of the instrument panel 26. Additionally, by positioning the ribs 250, 254 in areas prone to high stresses (e.g., proximate the steering column mount 196, the glove box opening 204, passenger airbag opening 208, and/or boundary region 240) a weight and cost savings can be achieved due to a decrease in amount of material necessary to be used. For example, in the depicted embodiment, placement of the reinforcement ribs 254 and the substrate ribs 250 proximate where the steering column 68 connects to the instrument panel 26 creates a stiffer connection, thus resulting in less noise, vibration and harshness experienced by a driver of the vehicle. In addition, bonding the substrate ribs 250 and the reinforcement ribs 254 to one another creates a disproportionate increase in the stiffness of the instrument panel 26 and allows for the substrate 120 and the reinforcement 150 to synergistically support the steering column 68, which reduces noise, vibration, and harness which results from the components.

Figure 4:
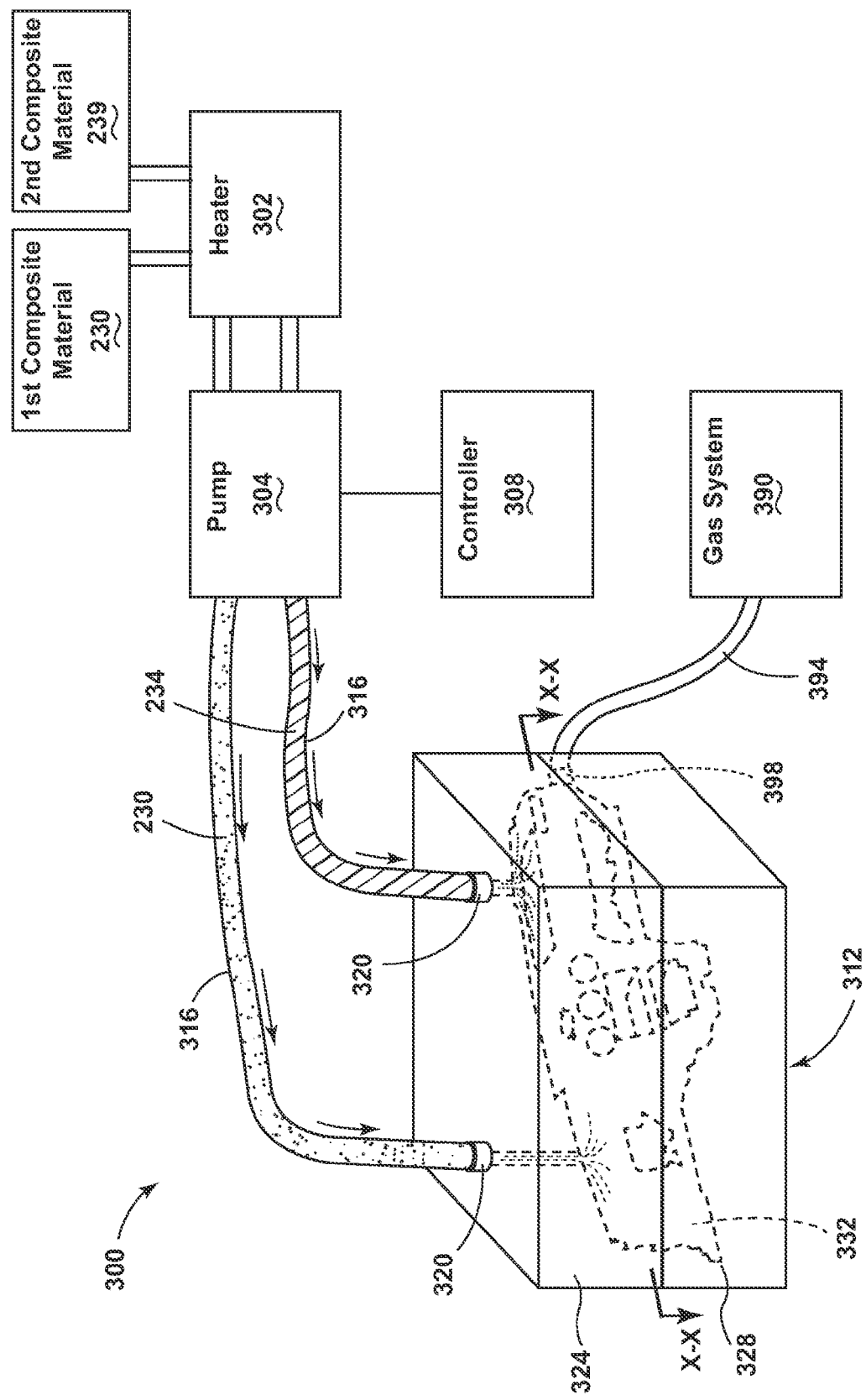
FIG. 4 is a top perspective view of an injection molding system according to an additional embodiment.

Referring now to FIG. 4, an injection molding system 300 used for forming the instrument panel 26 is depicted that includes a heater 302, a pump 304, a controller 308, a mold 312, a pair of injection lines 316, and a gas system 390, according to one embodiment. The heater 302 melts a first composite 230 and a second composite 234 and the pump 304 pressurizes and forces the melted first and second composites 230, 234 through the injection lines 316, and into the mold 312 via connection ports 320. The pump 304 is capable of producing high fluid pressures which permit the first and second composites 230, 234 to be injected into the mold 312 at high pressures and speeds. Each injection line 316 engages one of the connection ports 320 on the mold 312 such that the first and second composites 230, 234 can enter the mold 312 at different locations. In some embodiments of system 300, more than two composite materials can be injected into the mold 312. In these configurations, the injection molding system 300 can include separate injection lines 316 for each material and the mold 312 may contain separate connection ports 320 for each additional injection line 316. The gas system 390 is configured to inject pressurized gas though a gas line 394 and into the mold 312 though a gas nozzle 398.

When solidified, the first and second composite materials 230, 234 of FIG. 4 are suitable for formation of a final component, e.g., the instrument panel substrate 120 and reinforcement 150. The first composite 230 includes the first fiber material within the first resin. Similarly, the second composite 234 includes the second fiber material within the second resin. Accordingly, the first and second fiber materials and the first and second resins may be composed of any of the respective fibers and resins disclosed in conjunction with the instrument panel substrate 120 or the reinforcement 150.

Again referring to FIG. 4, the mold 312 has an A plate 324 and a B plate 328, each plate defining approximately half of a cavity 332 of the mold 312. The A plate 324 includes the connection ports 320 through which the first and second composite materials 230, 234 enter the mold 312. The A and B plates 324, 328 each contain an impression of one half of the final vehicular component (e.g., substrate 120, reinforcement 150, etc.) such that when the mold 312 is closed, the negative impressions define the mold cavity 332 with the approximate dimensions of the final component. In some embodiments, the mold 312 may include inserts and/or subassemblies to aid in formation of the final component.

Figure 5A:
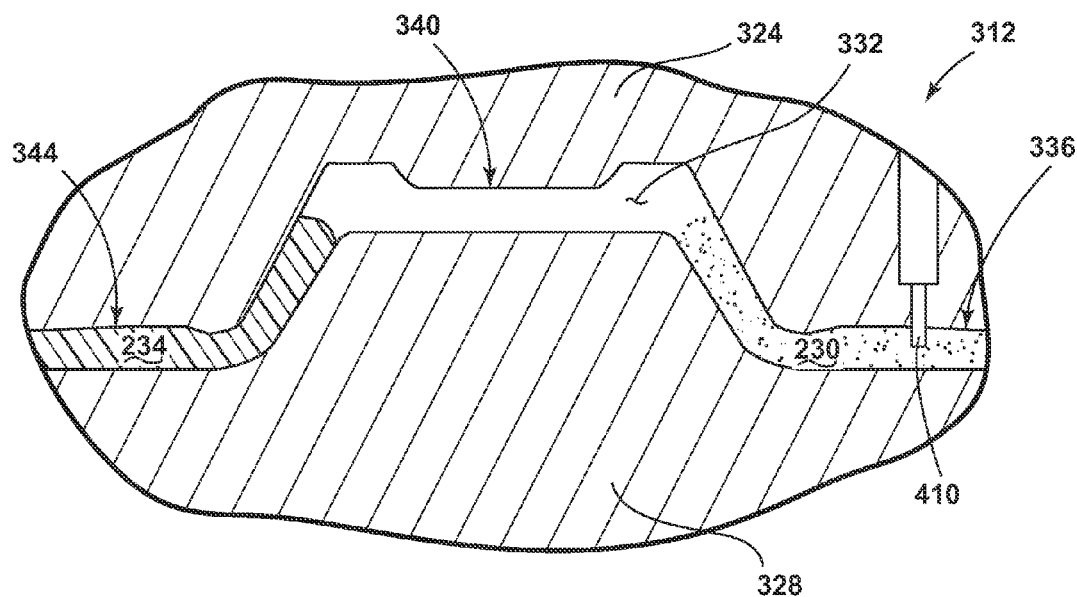
FIG. 5A is a cross-sectional view of the injection molding system of FIG. 4 during a step of injecting molten composites into a mold, taken at line X-X.

As shown in FIG. 5A, the mold 312, when configured to form a substrate 120, has a driver-side portion 336, a center-stack portion 340, and a passenger-side portion 344 oriented to form the respective portions 184, 180, 188 of the substrate 120 (FIG. 2). During injection of the melted first and second composites 230, 234, a clamping pressure is exerted on the mold 312 such that the A plate 324 and the B plate 328 are forced together. The force acting on the mold 312 prevents mold separation and flashing from occurring on the substrate 120. The mold 312, while depicted in a closed state in FIG. 5A, may be opened by separating the A plate 324 and the B plate 328. While the mold 312 is in an open state, the substrate 120 may be ejected, and the mold 312 and cavity 332 can then be cleaned. The injection molding system 300 employing mold 312 may also be used in a like manner as described above to form the reinforcement 150, the plenum bracket 220, or a variety of other vehicle components suitable for being fabricated with hybrid composites.

Figure 6:
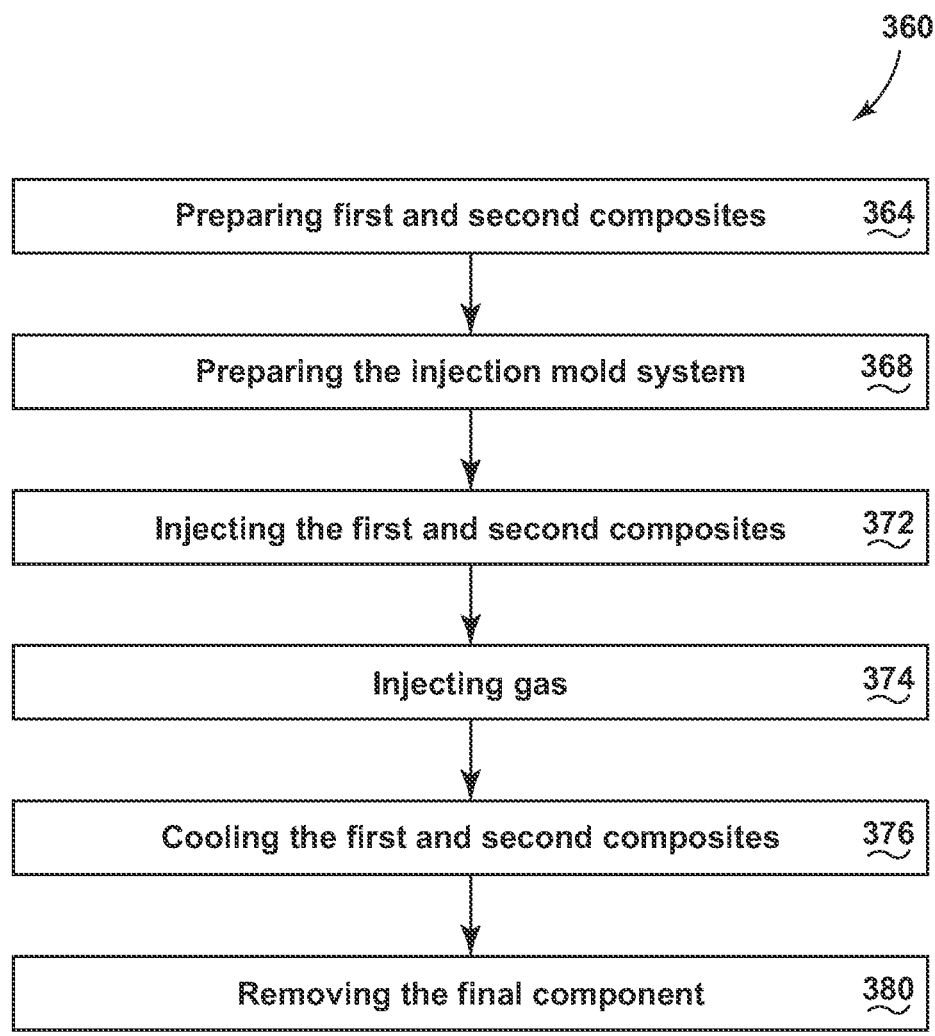
FIG. 6 is a schematic of a method for forming a vehicular component using the injection molding system of FIG. 4 according to another embodiment.

Referring now to FIG. 6, a schematic of a method 360 using gas-assisted molding configured for formation of a final component, such as the substrate 120 of the instrument panel 26, is provided. The method 360 includes six primary steps, labeled steps 364, 368, 372, 376, and 380. The method 360 begins with step 364 of melting the first and second composites 230, 234, followed by step 368 of preparing the injection molding system 300. Next, the step 372 of injecting the first and second melted composite materials 230, 234 into the cavity 332 of the mold 312 is performed. Step 374 of injecting gas into the mold 312 while the first and second composites 230, 234 are still molten is performed. The step 376 of cooling the melted first and second composites 230, 234 to form the final component, e.g., substrate 120 of the instrument panel 26, is conducted next. Finally, step 380 of removing the final component from the mold 312 is performed.

Referring to FIGS. 4-6, step 364 involves heating the first and second composites 230, 234 in the heater 302 to a temperature sufficient to melt the resin constituents. With the resins melted, the pump 304 is able to push the melted first and second composites 230, 234 through the injection lines 316 and into the cavity 332 of the mold 312 via the connection ports 320. The first and second composites 230, 234, particularly when comprising nylon resin, can be injected at a temperature between 100° C. and 400° C., and more preferably between 210° C. and 275° C. The melted first and second composites 230, 234 typically are superheated to a sufficiently high temperature to prevent their premature solidification in the injection lines 316 before reaching the cavity 332. As used herein, the term "superheat" refers to the temperature difference between the melting temperature and the injection temperature of the first and second composites 230, 234. The superheat is also necessary to ensure that the first and second composites 230, 234 have sufficiently low viscosity to enter narrow areas of the cavity 332. The superheat may be between 10° C. and 50° C. for composites 230, 234. Other injection temperatures and superheat conditions may be appropriate depending on the compositions selected for the composites 230, 234, geometry of the mold 312, and other conditions.

Step 368 of preparing the injection molding system 300 may include tasks such as preheating the mold 312, priming the injection lines 316, priming the gas system 390, and/or placing a preassembled fiber mat or multiple mats into the cavity 332 of the mold 312. Step 372 of injecting the first and second composites 230, 234 may have a duration of between 5 seconds and 30 seconds, and more preferably between 10 seconds and 20 seconds. Other durations may be appropriate for more complex mold cavity 332 geometries and/or lower melt viscosity compositions for the composites 230, 234. In some embodiments, the injection of the melted first and second composites 230, 234 may be simultaneous, while in other embodiments, each composite is injected separately. During the injection step 372, the melted first and second composites 230, 234 are injected into respective driver-side and passenger-side portions 336, 344 of the mold 312 (see FIG. 5A), thereby causing substantial segregation of the fibers in the final component, e.g., substrate 120. The composites 230, 234 may also be injected at other points in the cavity 332 to create the desired segregation or other properties.

With particular reference to FIG. 5A, a cross section of the mold 312 configured to produce the substrate 120 is depicted during the step 372 of injecting the first and second composite materials 230, 234 into the cavity 332 of the mold 312. The first and second composites 230, 234 are injected through a series of gates (not shown). The cavity 332 may be filled by injection of the first and second composites 230, 234 into respective driver-side and passenger-side portions 336, 344 of the cavity 332. Upon entering the mold 312, the melted first and second composites 230, 234 fluidly flow through the cavity 332 toward each other. One or more vents may be incorporated into the mold 312 proximate the center-stack portion 340, or other areas where the first and second composites 230, 234 meet, such that air can be expelled from the mold.

Figure 5B:
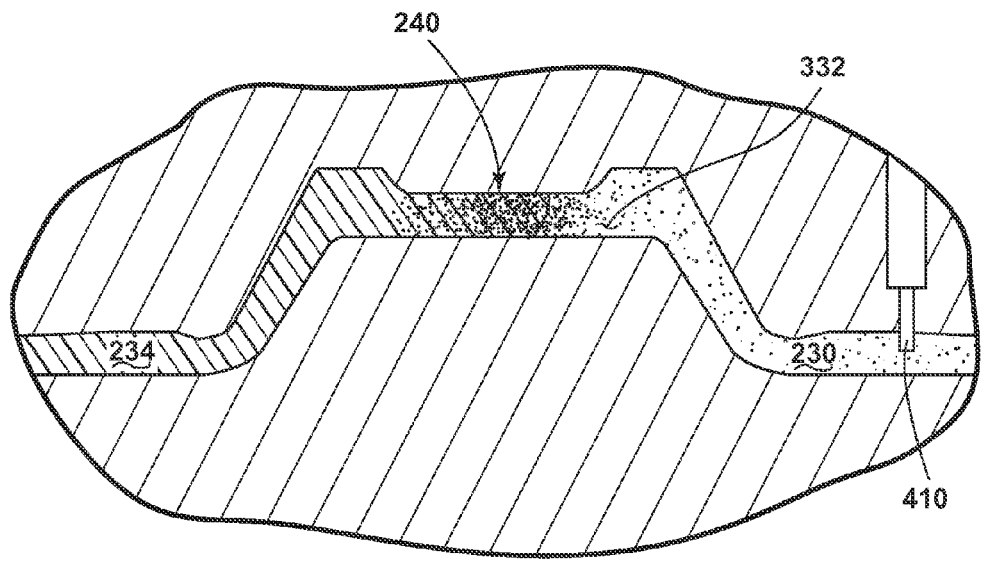
FIG. 5B is a cross-sectional view of the injection molding system of FIG. 4 during a step of mixing the melted composites, taken at line X-X.

Referring now to FIG. 5B, at a predetermined location in the cavity 332, the melted first and second composites 230, 234 continue to flow toward each other to combine to form the boundary region 240. The boundary region 240 includes a mixture of fibers and resins from the first and second composites 230, 234 and may have a width between 1 mm and 50 mm. The location and width of the boundary region 240 is controlled through design of the mold 312, processing parameters of the injection molding system 300 and the particular composition selected for the first and second composites 230, 234. The processing parameters may be controlled by the controller 308 (FIG. 4). In one exemplary embodiment, more than two composite materials having different compositions may be injected into the cavity 332 during the injection step 372. In this configuration, there can be a boundary region 240 between each of the composite materials such that each boundary region 240 has a different composition from the other boundary regions. Upon cooling and solidification of the first and second composites 230, 234, the mixture of the resins and fibers within the boundary region 240 creates an integral connection between the first composite material 230 and the second composite material 234, thereby holding the substrate 120 or other final component together.

Figure 5C:
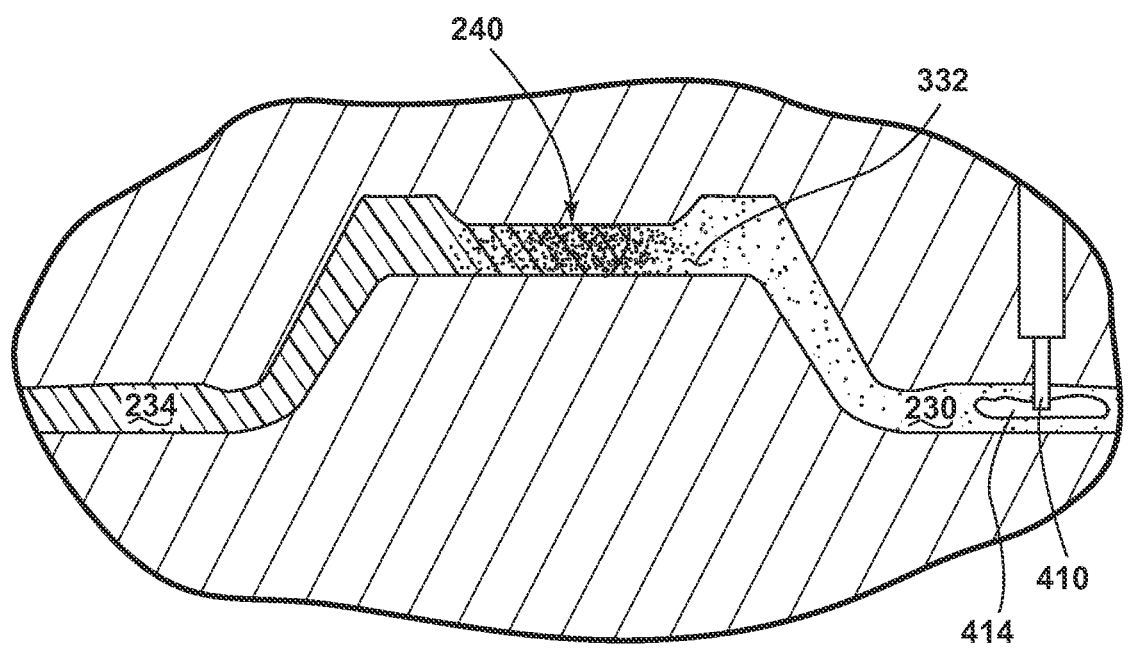
FIG. 5C is a cross-sectional view of the injection molding system of FIG. 4 during a step of injecting gas into the melted composites, taken at line X-X.

Referring specifically to FIG. 5C, step 374 of injecting the pressurized gas may be performed during or after filling of the mold 312 with the first and second composites 230, 234 has been completed. In one embodiment, as the molten first and second composites 230, 234 enter the mold 312, portions of the first and second composites solidify or partially solidify to form a skin around a still molten core of the first and second composites 230, 234. The injection of gas into the first or second composites 230, 234 is accomplished through the use of an injection nozzle 410. The gas system 390 pressurizes the gas which travels to the injection nozzle 410 and into the cavity 332. Injection of the pressurized gas into the core of the molten composites 230, 234 causes an air void 414 to be formed as the molten portion of the first and second composites 230, 234 is displaced by the pressurized gas. Simultaneously, the pressurized gas forces the solidified and partially solidified skin of the first and/or second composites 230, 234 to take the shape of the mold 312. As more gas is injected by the injection nozzle 410, the air void 414 expands. In embodiments where the injection nozzle 410 is positioned proximate the substrate or reinforcement ribs 250, 254 the air void 414 elongates and forms the substantially hollow portion of the ribs 250, 254. The gas system 390 may pressurize and inject a multitude of gasses including inert gasses (e.g., diatomic nitrogen, carbon dioxide, and noble gasses), pressurized air, or combinations thereof. The gas may be injected with a pressure of between about 500 psi to about 8000 psi, and more preferably between about 1000 psi and about 4000 psi. The temperature of the injected gas may be between 100° C. and 400° C., and more preferably between 210° C. and 275° C. Gas injection may be performed between about 0.1 second and about 20 seconds. Additionally, the gas may be injected into multiple locations throughout the mold 312 to form complex geometries.

Referring again to FIGS. 4-6, step 376 of cooling the melted first and second composites 230, 234 to form the final component, e.g., substrate 120, occurs while the mold 312 is held under pressure and chilled. The mold 312 may be water chilled or may be air chilled to promote solidification of the final component. After solidification of the substrate 120, the mold is opened and step 380 of removing the final component is carried out by actuating a series of ejection pins (not shown) to eject the final component from the B plate 328 of the mold 312.

It is to be understood that variations and modifications can be made on the aforementioned structure without departing from the concepts of the present invention. For example, the present disclosure of a hybrid composite and its method of manufacture could be equally applied to the grille of a motor vehicle. Attachment points in a hybrid composite grille, for example, may require added reinforcement in the form of chopped carbon fibers and air voids could provide mounting apertures. Further, it is to be understood that such concepts are intended to be covered by the following claims unless these claims by their language expressly state otherwise.

What is claimed is:

1. A vehicular instrument panel, comprising:
   a substrate comprising a first plurality of chopped carbon fibers and a first plurality of chopped glass fibers within a first nylon resin,
   wherein the first plurality of chopped carbon fibers and the first plurality of glass fibers in the substrate are segregated such that the carbon fibers and the glass fibers are each substantially concentrated within respective driver-side and passenger-side portions of the substrate;
   a reinforcement coupled to the substrate comprising a second plurality of chopped carbon fibers within a second nylon resin;
   a reinforcement rib integrally defined by the reinforcement, the reinforcement rib being substantially hollow and positioned on a driver-side portion of the reinforcement; and
   a substrate rib integrally defined by the substrate, the substrate rib being substantially hollow and positioned on the driver-side portion of the substrate,
   wherein the substrate rib and the reinforcement rib are bonded to one another.

2. The vehicular instrument panel of claim 1, wherein the first plurality of chopped carbon fibers in the substrate has a fiber volume fraction in the first nylon resin of about 15% to about 40%.

3. The vehicular instrument panel of claim 1, wherein the substrate rib and the reinforcement rib are defined and bonded adjacent a steering column mount on the substrate.

4. The vehicular instrument panel of claim 3, further comprising:
   a duct, wherein the duct, the reinforcement, the reinforcement rib, and the substrate rib cooperatively form a hollow tube.

5. The vehicular instrument panel of claim 1, wherein the substrate further comprises a boundary region where the first plurality of chopped carbon fibers and the first plurality of chopped glass fibers are substantially mixed.

6. The vehicular instrument panel of claim 5, wherein the first plurality of chopped carbon fibers in the driver-side portion of the substrate has a fiber volume fraction of about 30% to 40% in the first nylon resin, the first plurality of chopped glass fibers in the passenger-side portion has a fiber volume fraction of about 30% to 40% in the first nylon resin, and the first plurality of chopped carbon fibers and the first plurality of chopped glass fibers in the boundary region each have a fiber volume fraction of about 15% to 20% in the nylon resin.

7. A vehicular instrument panel, comprising:
   a first member comprising a fiber material within a first resin, the first member defining a first hollow rib; and
   a second member coupled to the first member having driver-side, passenger-side, and center-stack portions, the second member defining a second hollow rib in the driver-side portion which is bonded to the first hollow rib,
   wherein the driver-side portion comprises a first fiber material within a second resin, the passenger-side portion comprises a second fiber material within the second resin, and the center-stack portion comprises a mixture of the first and second fiber materials within the second resin.

8. The vehicular instrument panel of claim 7, wherein the first and second fiber materials are each selected from the group of materials consisting of carbons, aramids, aluminum metals, aluminum oxides, steels, borons, silicas, silicon carbides, silicon nitrides, ultra-high-molecular-weight polyethylenes, A-glasses, E-glasses, E-CR-glasses, C-glasses, D-glasses, R-glasses, and S-glasses.

9. The vehicular instrument panel of claim 7, wherein the first and second resins are each selected from the group of materials consisting of a nylon, a polypropylene, an epoxy, a polyester, a vinyl ester, a polyetheretherketone, a poly(phenylene sulfide), a polyetherimide, a polycarbonate, a silicone, a polyimide, a poly(ether sulfone), a melamine-formaldehyde, a phenol-formaldehyde, and a polybenzimidazole.

10. The vehicular instrument panel of claim 7, wherein the first and second resins have substantially the same composition.

11. The vehicular instrument panel of claim 7, wherein the driver-side and passenger-side portions of the second member each have a fiber volume fraction of the respective first and second fiber materials in the second resin of about 15% to about 40%.

12. The vehicular instrument panel of claim 11, wherein the first fiber material in the driver-side portion has a first fiber volume fraction of about 30% to 40% in the second resin, the passenger-side portion has a second fiber volume fraction of about 30% to 40% in the second resin, and the first and second fiber materials in the center-stack portion each have a fiber volume fraction of about 15% to 20% in the second resin.

13. The vehicular instrument panel of claim 7, wherein the first and second fiber materials each have an average fiber length of about 5 mm to about 7 mm.

14. The vehicular instrument panel of claim 7, wherein the driver-side portion of the second member further comprises a fiber mat reinforcement.

15. A vehicular instrument panel, comprising:
   a reinforcement comprising a plurality of chopped carbon fibers within a nylon resin, the reinforcement having a hollow reinforcement rib; and
   a substrate coupled to the reinforcement comprising a plurality of chopped carbon and chopped glass fibers segregated into respective driver-side and passenger-side portions, the substrate having a hollow substrate rib,
   wherein the reinforcement rib and the substrate rib are bonded to one another.

16. The vehicular instrument panel of claim 15, wherein the plurality of chopped carbon fibers and the chopped glass fibers of the substrate are disposed in a nylon resin, further wherein the substrate has a carbon fiber volume fraction in the nylon resin of about 15% to about 40%.

17. The vehicular instrument panel of claim 15, wherein the chopped carbon fibers in the substrate have an average fiber length of about 5 mm to about 7 mm.

18. The vehicular instrument panel of claim 15, wherein the substrate further comprises a boundary region where the plurality of chopped carbon and glass fibers are substantially mixed.

19. The vehicular instrument panel of claim 15, further comprising:
   a duct, wherein the duct, the reinforcement, the reinforcement rib, and the substrate rib cooperatively form a hollow tube.

20. The vehicular component of claim 15, wherein the passenger-side portion of the substrate further comprises a fiber mat reinforcement.

\* \* \* \* \*